March 15, 1955

R. S. LA FLEUR 2,704,332

MODIFIED BRIDGE RECTIFIER CIRCUIT

Filed Dec. 11, 1952

INVENTOR.
RICHARD S. LA FLEUR,
BY
*Nicholas T Vohr*
ATTORNEY.

INVENTOR.
RICHARD S. LA FLEUR,
BY
Nicholas T Vohr
ATTORNEY.

United States Patent Office 2,704,332
Patented Mar. 15, 1955

2,704,332

MODIFIED BRIDGE RECTIFIER CIRCUIT

Richard S. La Fleur, Los Angeles, Calif., assignor, by mesne assignments, to Hughes Aircraft Company, a corporation of Delaware Application December 11, 1952, Serial No. 325,345

7 Claims. (Cl. 307—58)

The present invention relates to rectifier circuits and is more particularly concerned with a modified bridge rectifier in which two different unidirectional potentials may be obtained from a single, tapped transformer winding.

In prior art full wave rectifiers it has been the normal practice to provide a single rectifier arrangement such as a bridge, basically comprising four interconnected rectifiers, connected across a source of alternating potential, for instance, the secondary of a transformer. Such an arrangement provides for a single direct-current output potential. In the event that more than one direct potential was required for the operation of the circuit fed by the rectifier, usual practice has been to provide a plurality of secondary windings on the power transformer, each having its own bridge or other form of rectifier. On the other hand, it has been the practice to tap off the single potential thus effected by one rectifier arrangement through an appropriate dropping resistor to produce a second lower potential with the concomitant parasitic dissipation of direct current power.

The foregoing arrangements have presented distinct disadvantages whenever several different direct-current voltages have been required, such as in the case where different magnitude plate supplies are needed for various tubes in an electronic circuit. Thus, if a plurality of distinct direct-current voltages have been required, the prior art arrangements have, for instance, required transformers having several secondaries. Such an arrangement entails greater expense and trouble in the wiring of the circuit not only because of the more complex transformer required, but also because of the necessary duplication in rectifying components. On the other hand, if the several voltages are to be derived by tapping off a single load resistor, the disadvantages of loss of power and complexity of circuitry connections, due to the dropping resistor, are encountered. In addition, considerable trouble also has been encountered in this latter arrangement, in that poor regulation may result due to the coupling of load variations from one circuit to the second circuit through the employment of a voltage dropping resistor. The avoidance of this effect has required that additional circuitry be employed to effect isolation between the various load circuits. A still further disadvantage has been encountered, in that it has been difficult, in prior art arrangements, to allow all direct voltages to be referred to a common point such as the chassis or ground.

It is accordingly an object of the present invention to provide a modified bridge rectifier in which at least two direct-current voltages may be derived from a single secondary winding of an alternating current power transformer.

Another object of this invention is the provision of a modified bridge rectifier circuit whereby additional direct-current voltages may be derived from a conventional bridge rectifier circuit without the requirement of additional transformer secondaries, and in which the several derived voltages may each be referred to a common point such as ground.

A further object of this invention resides in a circuit arrangement whereby existing bridge rectifiers may be simply and readily modified to provide a further different direct voltage output without the need of dropping resistors or complete duplication of existing rectifier components.

It is an additional object of this invention to provide a novel rectifying circuit for obtaining a plurality of direct-current outputs from a single transformer winding, the circuit being applicable to a single or a multiphase source of alternating potential.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Different voltages are obtained in accordance with the present invention by providing for a first direct-current output from a conventional full wave rectifying bridge, energized by the secondary winding of a power transformer and by effecting a further output from the same secondary winding by providing further rectifiers coupled to said source, said further rectifiers being so connected that full wave rectification is effected in cooperation with the original bridge rectifier.

Figure 1:
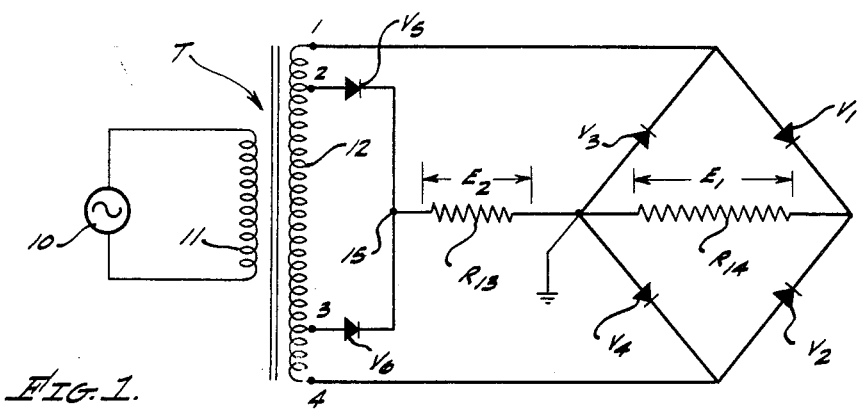
Fig. 1 illustrates a schematic diagram of a modified bridge rectifier circuit in accordance with this invention.

Referring to Fig. 1, a conventional source of alternating current 10, such as a power line or other alternating potential, is coupled to the primary winding 11 of a transformer T. A conventional bridge rectifier $V_1$—$V_2$—$V_3$—$V_4$ is connected across a secondary 12 of transformer T. The rectifiers disclosed throughout the present invention may be of any type having a low forward resistance and a high back resistance, such as a diode, selenium oxide or copper oxide rectifier, etc., the use of devices not requiring auxiliary filament power being preferable. In the described circuit, either the junction of $V_3$, $V_4$ or the junction of $V_1$, $V_2$ may be connected to a reference point, such as ground, depending on whether it is desired to develop a positive or negative unidirectional potential across a load resistor $R_{14}$ or other load which is connected between the junctions $V_3$, $V_4$ and $V_1$, $V_2$. Inasmuch as it is more common to develop a positive potential across the resistive load $R_{14}$, the operation of the rectifier of the present invention will be explained with junction $V_3$, $V_4$ connected to ground so as to accomplish this result.

Figure 2:
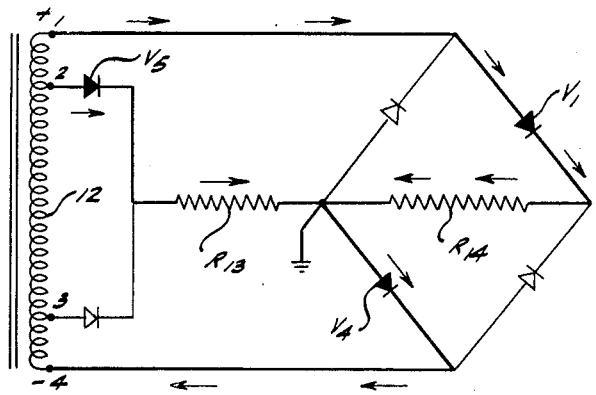
Figs. 2 and 3 are current flow diagrams for the rectifier circuit of Fig. 1.
Figure 3:
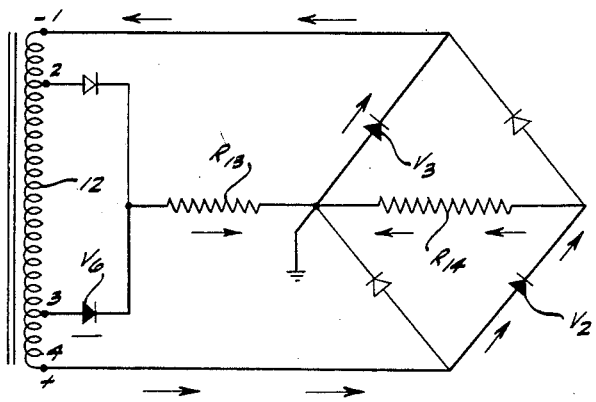

The operation of the conventional bridge portion of the rectifier is as follows: Let it be assumed that point 1 of secondary 12 is positive with respect to point 4 thereof. Current will flow, at said instant of time, from point 1 through rectifier $V_1$ and load $R_{14}$ to ground, and thence through rectifier $V_4$ to point 4 of secondary 12. At a later instant of time, when point 4 becomes positive to point 1, current flows in a similar fashion from point 4 through rectifier $V_2$ and load $R_{14}$ to ground, and thence through rectifier $V_3$ to point 1. Figs. 2 and 3 illustrate the direction of current flow for the rectifier circuit of Fig. 1 for the two conditions of potential distribution on secondary winding 12, namely, when terminal 1 is positive with respect to terminal 4 and when terminal 1 is negative with respect to terminal 4. As is well known, and as the foregoing discussion shows, the current through load $R_{14}$ is unidirectional for all conditions of the transformer secondary 12, and a first distinct potential $E_1$ is developed across $R_{14}$. The current through $R_{14}$, in the absence of other circuitry, such as filters, is pulsating and at twice the frequency of source 10. It is accordingly contemplated that appropriate filters will be used before the loads to smooth out any ripple appearing in the rectifier output, load $R_{14}$ representing the equivalent impedance of the entire network.

The modified bridge rectifier, in accordance with this invention, also employs two further rectifiers $V_5$ and $V_6$, each similarly connected polarity-wise, at one end to taps 2 and 3, respectively, which are symmetrically placed on secondary 12, and their other ends connected together to form a common junction 15. An additional load $R_{13}$ is connected between this common junction 15 and the reference point which in this case is ground.

The operation of this modified portion of the bridge is as follows. It will be seen that at the instant point 1 of the secondary 12 is positive with respect to point 4, point 2 is also positive with respect to point 4. Current will therefore flow, at this instant, through rectifier $V_5$, load $R_{13}$ to ground, and thence through rectifier $V_4$ of the original bridge, along with the $R_{14}$ current therethrough, back to point 4. In this respect it should be noted that although point 3 is also positive with respect to point 4 at this instant of time, $V_6$ will not conduct because its cathode is connected to the cathode of $V_5$ and is therefore at a potential that is more positive than that of its plate.

When the polarity of voltage reverses across winding 12, current will flow from point 3 through $V_6$, $R_{13}$, to ground and thence through $V_3$ of the original bridge back to point 1, thus, a second and distinct voltage $E_2$ is developed across $R_{13}$, the value of which voltage is dependent upon the A. C. voltage appearing between points 2 and 4 (or 1 and 3). In this respect, it should be noted that taps 2 and 3 are preferably chosen so that the alternating potential between 1 and 3 is equal to that between 2 and 4, in order to minimize ripple. This voltage, in the case of the circuit of Fig. 1, may be so chosen that it lies anywhere between ½ and the full value of the voltage across secondary 12. Thus, $E_2$ must be greater than ½$E_1$ and less than $E_1$. The special case wherein $E_1$ is equal to $E_2$ would merely result in $V_1$ and $V_2$ being used to rectify the current normally rectified by $V_5$ and $V_6$ respectively, so that this special case in effect degenerates to the conventional bridge with $R_{13}$ being in parallel with $R_{14}$.

Figure 4:
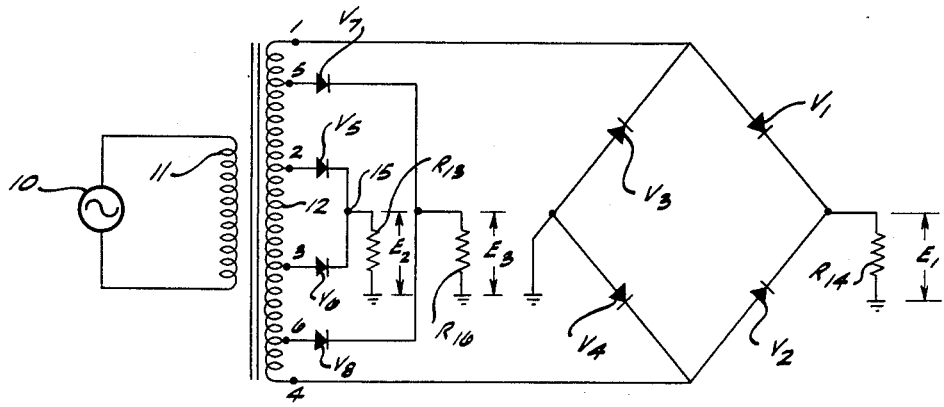
Fig. 4 is a schematic diagram illustrating a modified version of the circuit of Fig. 1, the modification residing in providing a plurality of direct current outputs.
Figure 5:
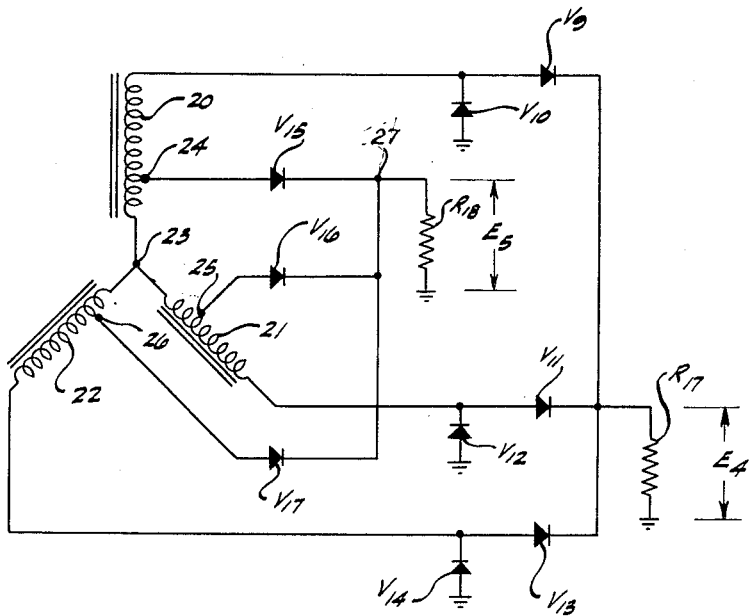
Fig. 5 is a schematic diagram illustrating the application of the present invention to a three-phase power system.

The foregoing techniques may also be used, of course, to provide a plurality of unidirectional output potentials by using additional pairs of symmetrically placed taps. Referring to Fig. 4 there is illustrated the circuit of Fig. 1 wherein the secondary winding 12 has additional symmetrically placed taps 5 and 6. Rectifiers $V_7$ and $V_8$ are connected between taps 5, 6 and a load resistor $R_{16}$ in the same manner as rectifiers $V_5$, $V_6$ so as to develop a third unidirectional output potential, $E_3$, across load resistor $R_{16}$.

The foregoing modifications on bridge rectifiers can also be used to modify a polyphase bridge rectifier which, in effect, are merely special applications of the circuit illustrated in Fig. 1. An example of such three-phase bridge rectifier is illustrated in Fig. 4. Referring to Fig. 4, secondary windings 20, 21 and 22 of a three-phase system are Y-connected (star-connected in the case of a polyphase system) having a common junction point 23 and taps 24, 25 and 26 disposed equidistant from junction point 23 on windings 20, 21 and 22, respectively.

Secondary windings 20, 21 and 22 are used to energize a three-phase bridge rectifier circuit comprising rectifiers $V_9$, $V_{10}$, $V_{11}$, $V_{12}$, $V_{13}$ and $V_{14}$ thereby providing a first unidirectional output potential, $E_4$, developed across a load resistor $R_{17}$. A second unidirectional output potential, $E_5$, having the same polarity as the first output potential may then be developed across a load resistor $R_{18}$ by appropriately connecting rectifiers $V_{15}$, $V_{16}$ and $V_{17}$ between taps 24, 25 and 26, respectively, and a common junction 27 which is connected to resistor $R_{18}$. The circuit illustrated in Fig. 4 may be regarded as an extension of the modified bridge rectifier circuit described and illustrated in connection with Fig. 1 in that, if the secondary winding 12 of Fig. 1 were regarded as two windings connected together at a common junction at the center, the circuit of Fig. 4 merely shows an additional winding with associated circuitry connected to the common junction. The addition of more secondary windings to the circuit of Fig. 1 also involves the use of additional phases provided by the added windings which in turn produces a multiphase rectified output. These additional phases are, of course, taken care of by the use of an appropriate alternating current polyphase source.

I claim:

1. A rectifying circuit for providing at least two unidirectional output potentials of different magnitude, said rectifying circuit comprising transformer means including a secondary winding having at least two taps disposed on said winding, bridge rectifying means having a first common junction, said bridge rectifying means being connected across said secondary winding for providing a first unidirectional output potential with respect to said first common junction, and at least two unidirectionally conducting devices, each of said devices being connected between one of said taps and a second common junction for providing a second unidirectional output potential between said second common junction and said first common junction, said unidirectionally conducting devices being poled to permit current flow in a like direction to said second common junction, and to make said first and second output potentials have the same unidirectional polarity.

2. The rectifying circuit as defined in claim 1 wherein said taps are symmetrically disposed on said winding.

3. A rectifying circuit for providing at least two unidirectional output potentials of different magnitude, said rectifying circuit comprising transformer means including at least two secondary windings connected together at a common point, each of said secondary windings having substantially an equal number of turns and a tap positioned equidistant from said common point, bridge rectifying means having a point of substantially fixed potential, said bridge rectifying means being connected across said secondary windings to provide a first unidirectional output potential with respect to said point of substantially fixed potential; a common junction, and a unidirectionally conducting device for each secondary winding, each device being connected between the tap on its respective winding and said common junction, said devices being poled to permit current flow in like directions to said common junction thereby to provide a second unidirectional output potential between said common junction and said point of substantially fixed potential, said first and second unidirectional output potentials having the same polarity with respect to said point of said bridge rectifying means.

4. A rectifying circuit for providing two unidirectional output potentials of different magnitudes, said rectifying circuit comprising transformer means including a secondary winding having first and second taps positioned symmetrically with respect to the center of said secondary winding, bridge rectifying means having first and second pairs of terminals, said first pair of terminals constituting the input and said second pair of terminals constituting the output of said bridge rectifying means, said first pair of terminals being connected across said secondary winding to provide a first unidirectional output potential between said second pair of terminals; a common junction, and first and second unidirectionally conducting devices connected from said first and second taps, respectively, to said common junction to provide a second unidirectional output potential between said common junction and one of said second pair of terminals of said rectifying means, said first and second unidirectional conducting devices being poled to permit current flow in like directions with respect to said common junction.

5. A rectifying circuit for providing $n$ unidirectional output potentials of different magnitude, said rectifying circuit comprising transformer means including a secondary winding having ($n-1$) pairs of first and second taps, each pair being positioned symmetrically with respect to the center of said secondary winding; bridge rectifying means having first and second pairs of terminals, said first pair of terminals constituting the input and said second pair of terminals constituting the output of said bridge rectifying means, said first pair of terminals being connected across said secondary winding to provide a first unidirectional output potential between said second pair of terminals; ($n-1$) common junctions, and ($n-1$) pairs of first and second unidirectionally conducting devices, each pair of first and second unidirectionally conducting devices being connected from one pair of said first and second taps, respectively, to one of said ($n-1$) common junctions to provide an additional ($n-1$) unidirectional output potential between each of said ($n-1$) common junctions and one of said second pair of terminals, each of said unidirectionally conducting devices being poled to permit current flow in a like direction to each of said ($n-1$) common junctions.

6. A rectifying circuit for providing two unidirectional output potentials of different magnitude, said rectifying circuit comprising three-phase transformer means including first, second, and third Y-connected secondary windings having a first common junction, each of said secondary windings having a tap positioned substantially equidistant from said first common junction, bridge rectifying means having a point of substantially fixed potential and connected across said first, second, and third Y-connected secondary windings to provide a first unidirectional output potential with respect to said point of substantially fixed potential; a second common junction, and first, second, and third unidirectionally conducting devices connected, respectively, from said taps of said first, second, and third secondary windings to said second common junction, said devices being poled to permit current flow in a like direction with respect to said second common junction thereby to provide a second unidirectional output potential between said second common junction and said point of substantially fixed potential of said bridge rectifying means, said first and second unidirectional output potentials having the same polarity with respect to said point of said bridge rectifying means.

7. A rectifying circuit for providing two unidirectional output potentials of different magnitude, said rectifying circuit comprising polyphase transformer means including a plurality of star-connected secondary windings having a first common junction, each of said secondary windings having a tap positioned equidistant from said common junction, bridge rectifying means having a point of substantially fixed potential and connected across said plurality of star-connected secondary windings to provide a first unidirectional output potential with respect to said point of substantially fixed potential, a second common junction, and a plurality of unidirectionally conducting devices, each device being connected between each of said taps on said secondary windings and said second common junction, said devices being poled to permit current flow in a like direction with respect to said second common junction thereby to provide a second unidirectional output potential between said second common junction and said point of substantially fixed potential of said bridge rectifying means, said first and second unidirectional output potentials having the same polarity with respect to said point of said bridge rectifying means.

References Cited in the file of this patent

UNITED STATES PATENTS 2,502,729    Klinkhamer _____ Apr. 4, 1950